April 19, 1927.  1,625,379
P. SWEENEY
DISK HARROW
Filed June 9, 1926  2 Sheets-Sheet 2
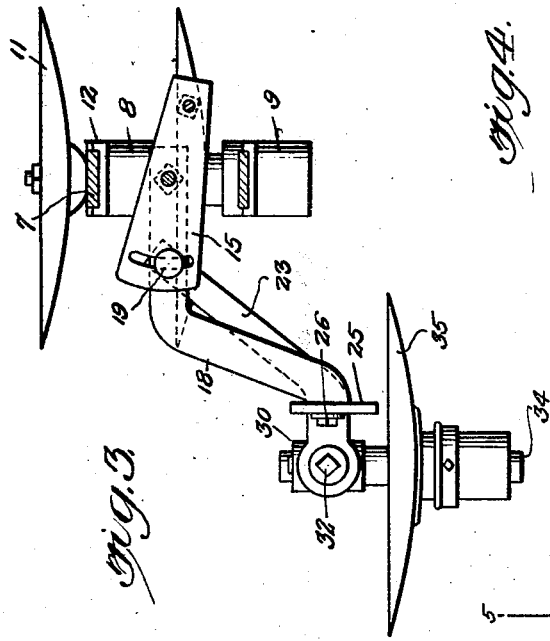
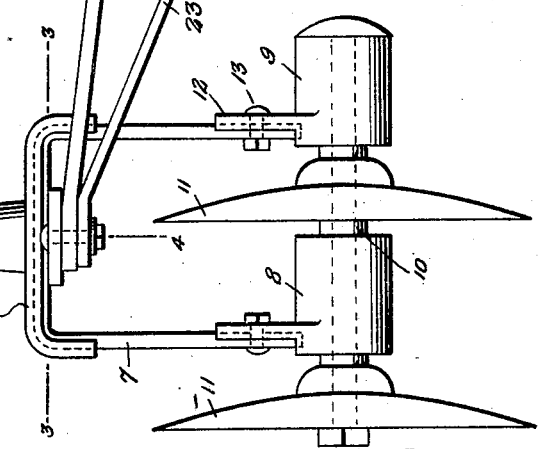
Inventor
Patrick Sweeney,
By Clarence A O'Brien
Attorney Patented Apr. 19, 1927.

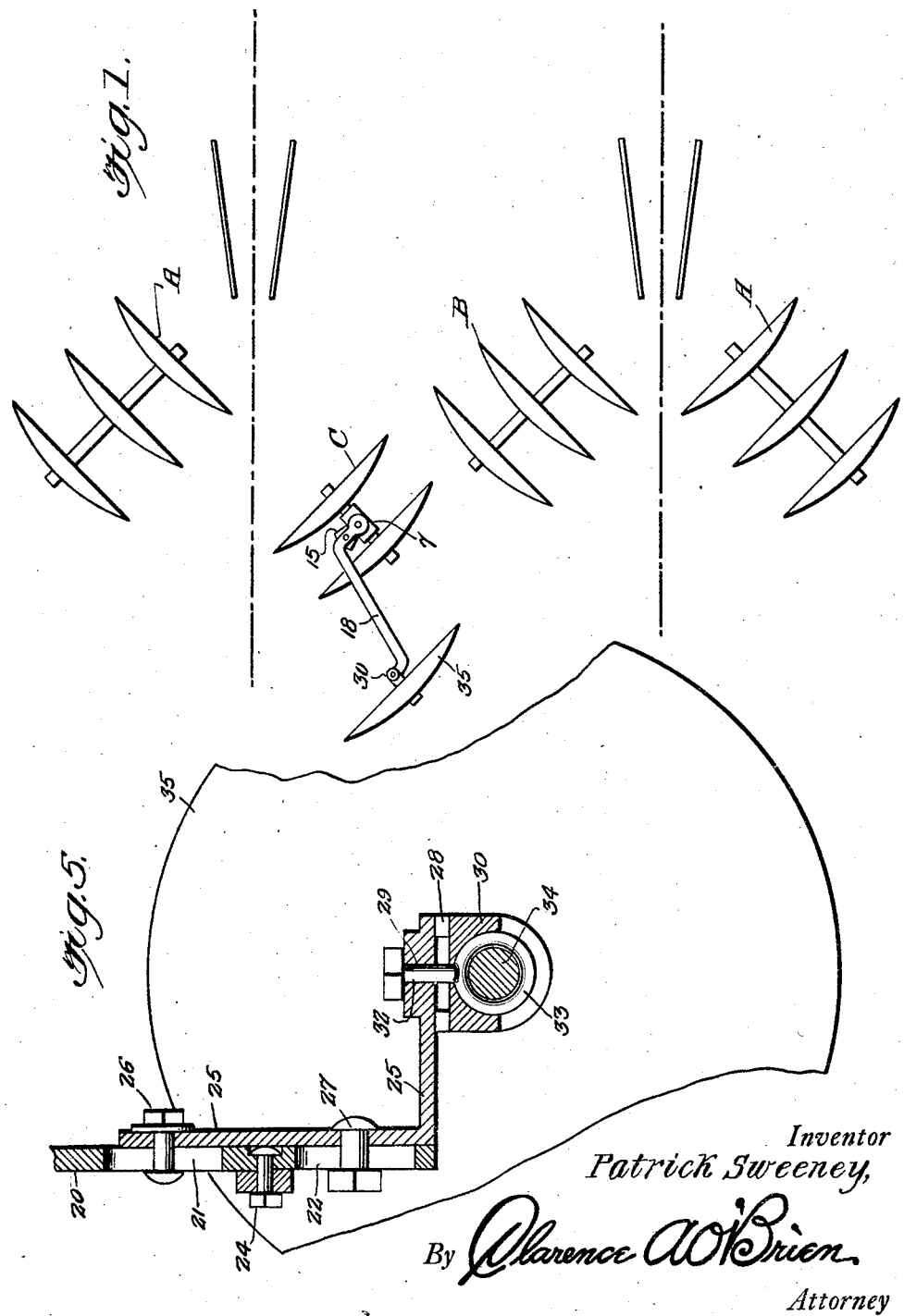

1,625,379

UNITED STATES PATENT OFFICE.

PATRICK SWEENEY, OF WISNER, NEBRASKA.

DISK HARROW.

Application filed June 9, 1926. Serial No. 114,769.

The present invention relates to improvements in cultivators or harrows of the disk type, and the distinguishing feature thereof lies in the arrangement of the disks in the center, particularly that of the right hand disk of the left center gang.

The novel combination lies in the two rear disk gangs, one in advance of the other, at their inner ends, and an auxiliary disk essentially in the space between the two inner disks of the foremost gang and behind the same, and organized to take up more or less of the loose soil left by the inner disk of the front gang and to throw that soil into the furrows left by the two inner disks of both gangs, so as to practically level off the surface over which said two inner disks have passed, and yet to fully cultivate the same.

Another very important feature of the invention is to provide for adjusting the vertical position of this auxiliary disk so as to vary the depth of its cut relatively to the depth of the cut of the gang disks and to change or adjust the angular position of the auxiliary disk relative to the gangs, so that under any and all conditions, the auxiliary disk will leave a practically level surface in all kinds of soil.

Another important feature of the invention is to provide a new and improved method of attaching and adjusting said auxiliary disk in the rearmost gang of disks.

Another very important object of the invention lies in an improvement of this nature which may be readily incorporated with structures now in common use and is capable of easy assembly and disassembly, convenient of manipulation, and which is strong and durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings

Figure 1 is a diagrammatic view showing the arrangement of the gangs of disks,

Fig. 2 is an elevation of the rearmost gang of disks,

Fig. 3 is a horizontal section therethrough, taken substantially on the line 3—3 of Fig. 2, Fig. 4 is a detail vertical section taken substantially on the line 4—4 of Fig. 2, and Fig. 5 is another detail vertical section taken substantially on the line 5—5 of Fig. 2.

Referring to the drawing in detail, it will be seen that in Fig. 1, I have illustrated diagrammatically, a well known arrangement of disk gangs in a cultivator. The two outside gangs are designated by the letters A, while the two inside gangs are designated generally by the letters B and C, the latter being disposed rearwardly of the former. My improvement lies more particularly in the gang C, and I shall only describe this gang in detail as an understanding thereof will bring about a clear and distinct comprehension of all the features of the invention.

The numeral 5 designates a casting having an inverted U-shaped channeled yoke 6 thereon for receiving the bight and adjacent portions of an inverted U-shaped yoke 7. A pair of sleeves 8 and 9 are mounted on the axle 10 of the disks 11 which form the gang C. Channeled lugs 12 rise from the sleeves 8 and 9 for receiving the lower ends of the inverted U-shaped yoke 7, and the ends are detachably fixed to the lugs 12 by means of bolts 13, or in any other suitable manner.

A bolt 14 extends through the casting 5 and through the bight portions of the yokes 6 and 7, as is clearly illustrated in Fig. 4 of the drawing. A plate 15 is pierced by the bolt 14 below the bight of yoke 7 and is secured to an arm 16 projecting from the casting 5 by means of a bolt or other suitable fastening element 17. A supporting bar 18 has one end pierced by the bolt 14 and is disposed below the plate 15 being secured thereto by a bolt or other fastening element 19. The bar 18 is provided with a downwardly disposed extension having therein spaced slots 21 and 22.

A bracing rod 23 is engaged on the bolt 19 and engaged to an intermediate portion of the extension 20 by a bolt 24. An L-shaped bracket 25 has one arm thereof adjustably fixed to the extension 20 by a pair of bolts 26 and 27 piercing slots 21 and 22 respectively, as is clearly shown in Fig. 5 of the drawings. On the under surface of the extremity of the lower arm of the bracket 25, there is formed an annular series of teeth 28, an aperture 29 being centrally located in respect thereto.

A bearing casting 30 has a flattened upper portion provided with a series of teeth 31 for association with the teeth 28, a pivot bolt 32 piercing the aperture 29 and having an eye head 33 disposed about an axle shaft 34 journaled in the bearings 30, and on which is disposed the auxiliary disk 35.

As is clearly shown in Fig. 1, it will be seen that this auxiliary disk 35 of the gang C is located to the rear of the space between the inner disks of the gangs B and C, and therefore attains the features of advantage enumerated in the statement of this invention. It is thought that the operation, advantages, utility, and construction of this invention will now be clearly understood by those skilled in this art without a more detailed description thereof.

It is desired, however, to point out that the auxiliary disk may be placed in numerous different positions in relation to the gang C and at a position to cut in different depths as may be desired or preferred. The present embodiment of the invention has been disclosed in detail merely by way of example, since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A disk gang including, in combination, a casting, means for mounting a gang of disks on the casting, a bar extending from the casting and having a depending extension provided with a pair of slots, a bracket having a pair of arms one of which is provided with slots, a pin piercing the slots for affording vertical adjustment of the bracket in relation to the extension, and means for journaling a single auxiliary disk on the other arm of the bracket.

2. A disk gang including, in combination, a casting, means for mounting a gang of disks on the casting, a bar extending from the casting and having a depending extension provided with a pair of slots, a bracket having a pair of arms one of which is provided with slots, a pin piercing the slots for affording vertical adjustment of the bracket in relation to the extension, the terminal of the other arm of the bracket having an opening and a series of teeth arranged about the opening, a bearing having a series of teeth associated with the first series of teeth and a shaft receivable in the bearing, an eye bolt having its eye pierced by the shaft and its shank piercing the opening of the lower arm of the bracket, and an auxiliary disk on the shaft.

3. A disk gang including, in combination, a casting, means for mounting a gang of disks on the casting, a bar extending from the casting and having a depending extension provided with a pair of slots, a bracket having a pair of arms one of which is provided with slots, a pin piercing the slots for affording vertical adjustment of the bracket in relation to the extension, means for journaling a single auxiliary disk on the other arm of the bracket, the bolt in the upper portion of the first arm piercing an arcuate slot provided in the upper portion of said last mentioned arm.

4. A disk gang including, in combination, a casting, means for mounting a gang of disks on the casting, a bar extending from the casting and having a depending extension provided with a pair of slots, a bracket having a pair of arms one of which is provided with slots, a pin piercing the slots for affording vertical adjustment of the bracket in relation to the extension, the terminal of the other arm of the bracket having an opening and a series of teeth associated with the first series of teeth, and a shaft receivable in the bearing, an eye bolt having its eye pierced by the shaft and its shank piercing the opening of the lower arm of the bracket, and an auxiliary disk on the shaft, the upper bolt associated with the first mentioned arm piercing an arcuate slot provided in the upper portion of said first mentioned arm.

In testimony whereof I affix my signature.

PATRICK SWEENEY.